No. 656,129. Patented Aug. 14, 1900.
O. WESTON.
BICYCLE SUPPORT.
(Application filed June 3, 1898.)
(No Model.)
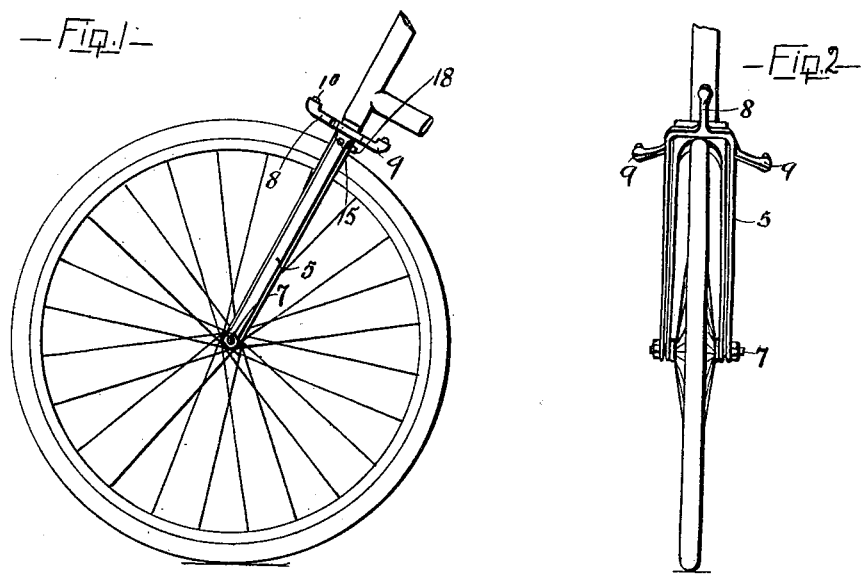
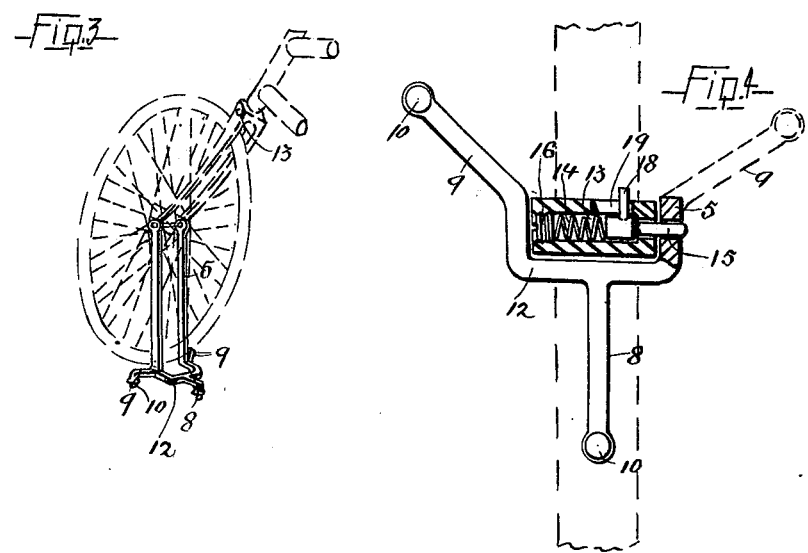

UNITED STATES PATENT OFFICE.

OLIVER WESTON, OF MONTREAL, CANADA, ASSIGNOR OF ONE-HALF TO JAMES COLEMAN, OF SAME PLACE.

BICYCLE-SUPPORT.

SPECIFICATION forming part of Letters Patent No. 656,129, dated August 14, 1900.

Application filed June 3, 1898. Serial No. 682,480. (No model.)

*To all whom it may concern:*

Be it known that I, OLIVER WESTON, of the city of Montreal, Province of Quebec, Canada, have invented certain new and useful Improvements in Bicycle-Supports; and I do hereby declare that the following is a full, clear, and exact description of the same.

My invention has for its object to provide a bicycle-support that can be attached to and carried by the bicycle and that will be effective in not only maintaining the bicycle in a vertical position, but will also effectively prevent it rolling after the support has been adjusted to perform its function.

The invention may be said, briefly, to consist in pivotally connecting a tripod-bracket at the axis of the front wheel of the bicycle by a rigid connection, preferably in the form of a fork adapted to straddle said wheel, while the support thus constructed is held in its position out of contact with the ground, preferably, by means of a spring-latch taking through the front fork of the bicycle and into one of the prongs of the fork of my improved support. For full comprehension, however, of the invention reference must be had to the accompanying drawings, in which like symbols indicate the same parts, and wherein—

Figure 1 is a side elevation of the front portion of a bicycle illustrating my invention applied thereto; Fig. 2, a front view thereof; Fig. 3, a detail perspective view illustrating the support in use; and Fig. 4, a detail transverse sectional view of the front fork of the bicycle, illustrating the spring-latch and the tripod-bracket in plan view.

My improved support consists, preferably, of a forked section 5, fulcrumed at the free end of its prongs to the axle 7 of the front wheel, while the other end of the fork has preferably cast in one therewith a longitudinally and a pair of transversely extending legs 8 and 9 9, respectively, each having its end offset and provided with a knob 10.

The portion of the support between the transversely-extending legs 9 9 is cut away, thereby leaving but a narrow connecting-piece 12 and enabling the support to partially inclose the front fork of the bicycle, which is bored transversely thereof, as at 13, and receives a coiled spring 14 and a bolt 15, actuated thereby and adapted to take into a perforation in one of the prongs of the support, these parts being held in place by a screw-threaded plug 16, taking into one end of the boring, and the bolt is adapted to be pushed back against the spring by means of a projection 18, carried thereby and projecting through a slot 19 in the fork of the bicycle.

It is obvious that by pushing back the bolt 15 the support will be released and allowed to drop to the position shown in Fig. 3, in which position it will effectively prevent the bicycle falling to either side or rolling away from the place in which it may be set, a handle 20 being provided to facilitate the returning of the support to the position shown in Figs. 1 and 2.

Many changes may be made in the precise construction illustrated and described herein without departing from the spirit of my invention.

What I claim is as follows:

A solid portable bicycle-support having a pair of legs oblong in cross-section and pivoted at their extreme ends to the axle of the front wheel of the bicycle and adapted when the support is not in use to fit against and brace the sides of the front of the bicycle, the opposite ends of said legs being connected by a flat U-shaped portion, extending at right angles to said legs and adapted to incase three sides of the crown of the fork of the bicycle, a spring device carried by the front fork of the bicycle to engage said support and maintain same out of contact with the ground substantially as and for the purpose set forth.

In testimony whereof I have affixed my signature in presence of two witnesses.

OLIVER WESTON.

Witnesses:
JAMES COLEMAN,
WILLIAM P. MCFEAT.